May 5, 1931.  H. H. SCHOTT  1,803,729
HANDLE CONSTRUCTION FOR VESSELS
Filed July 18, 1929
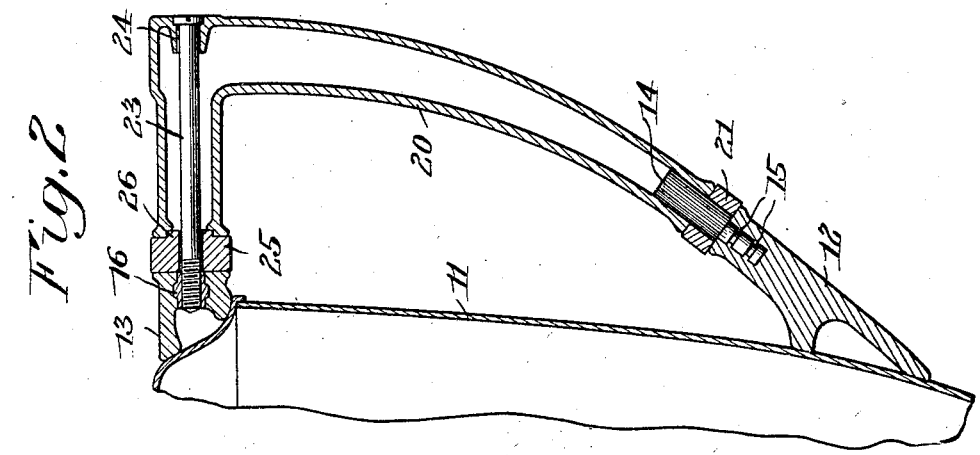
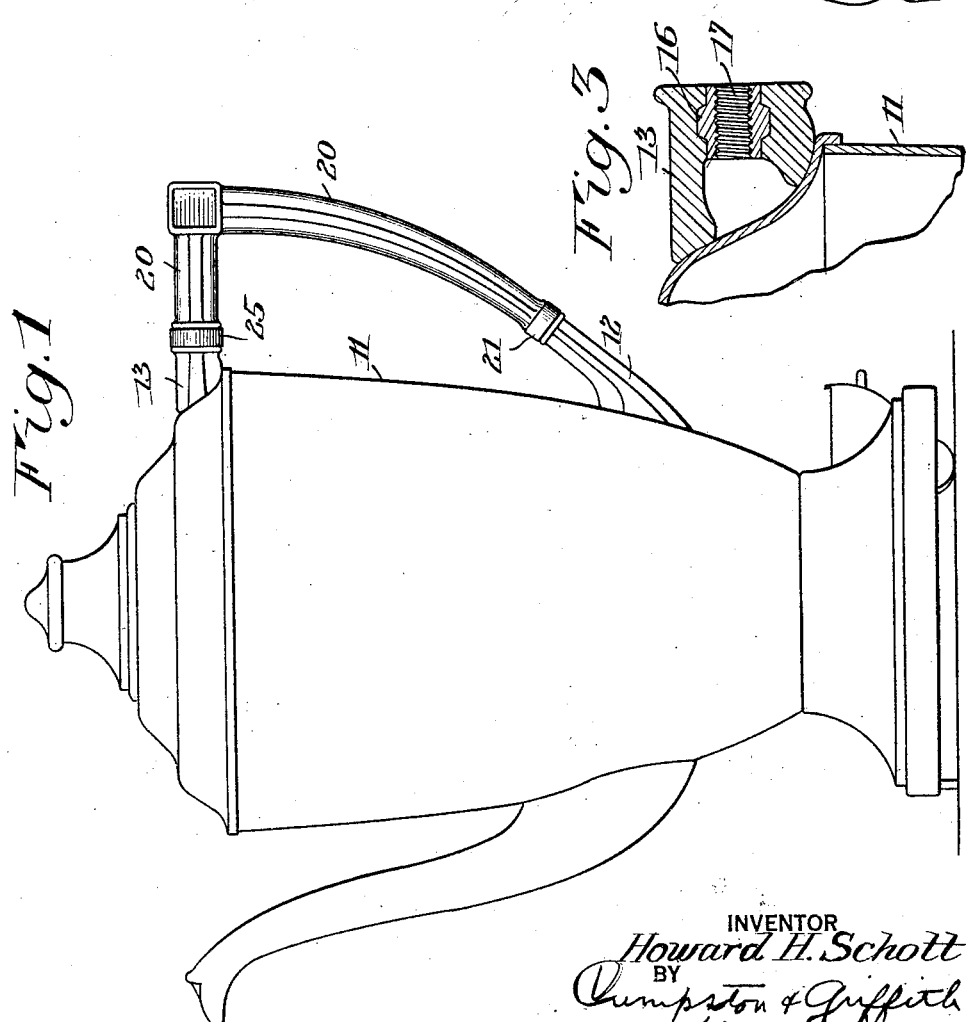
INVENTOR
Howard H. Schott
BY
Cumpston & Griffith
his ATTORNEYS Patented May 5, 1931

1,803,729

UNITED STATES PATENT OFFICE

HOWARD H. SCHOTT, OF ROCHESTER, NEW YORK, ASSIGNOR TO ROBESON-ROCHESTER CORPORATION, OF ROCHESTER, NEW YORK, A CORPORATION OF NEW YORK

HANDLE CONSTRUCTION FOR VESSELS

Application filed July 18, 1929. Serial No. 379,291.

This invention relates to a handle construction for vessels such as percolators, coffee pots, and the like. One of the principal objects of the invention is to produce a generally improved and more satisfactory handle construction than those heretofore known.

Another object is the provision of a handle construction which employs a relatively light handle so that there is less tendency for the handle to tip over the vessel to which it is attached than when a heavy handle is employed.

Still another object is the provision of a handle construction especially adapted to the use of hollow cast handles.

A further object is the provision of novel means for retaining a handle in position on the vessel, such means being designed to permit attachment of the handle extremely rapidly, and to hold it securely in place when once attached.

To these and other ends the invention resides in certain improvements and combinations of parts, all as will be hereinafter more fully described, the novel features being pointed out in the claims at the end of the specification.

In the drawings:

Fig. 1 is a side elevation of a vessel provided with a handle constructed in accordance with a preferred embodiment of the invention;

Fig. 2 is a fragmentary vertical section taken centrally through the handle construction and part of the vessel; and Fig. 3 is a fragmentary vertical section on an enlarged scale showing the construction of the upper handle bracket.

Similar reference numerals throughout the several views indicate the same parts.

By way of example, the handle construction forming the subject matter of this invention is illustrated as applied to an electric coffee percolator 11, but it should be understood that this is only for purposes of illustration, and that the handle construction is equally applicable to many other forms of vessels, cooking utensils, and the like.

A lower bracket 12 and an upper bracket 13, conveniently made of some relatively soft material such as a lead alloy, are secured to the vessel at appropriate points by solder or the like. A pin 14 is securely fixed to the lower bracket 12 and projects therefrom at an acute angle to the adjacent sides of the vessel, as shown especially in Fig. 2, this pin being preferably made of harder material such as copper or brass or the like. The pin 14 may be conveniently moulded solidly into the bracket 12 when the latter is made, and to insure that it is held firmly in the bracket, it may have grooves or corrugations 15.

The upper bracket 13 has moulded therein a bushing 16 of brass or similar material which is sufficiently hard to have screw threads formed therein, and this bushing is internally threaded as at 17.

The handle member is of generally L-shape construction, and is designated by the numeral 20 in Figs. 1 and 2. This handle member may be of any suitable material such as metal, and is preferably hollow in order to reduce the weight thereof and to minimize the tendency of the handle to overbalance and upset the vessel to which it is attached. Such a hollow handle may be conveniently made of cast metal. When metal is cast in the form of a hollow member, two openings in the walls of the member are ordinarily required according to the usual and most satisfactory foundry practice. The handle member 20 is open at both ends, thus conforming to the requirements of the foundry practice mentioned above, and permitting handle members to be made economically by the usual casting methods.

The opening at the lower end of the handle member is of such diameter as to have a snug sliding fit over the pin 14. In assembling the handle, a heat insulating bushing 21 is first placed over the pin 14 as shown in Fig. 2, and the lower end of the handle is then slipped over the pin, longitudinal movement of the handle being limited by the bushing 21.

Then a long screw 23 is inserted through a small opening 24 near the top of the handle so that it projects from the opening at the end of the handle and through a heat insulating bushing 25, and is screwed into the threads 17 of the threaded bushing 16. This screw 23 secures the upper end of the handle member to the bracket 13, and at the same time holds the handle member so that the lower end thereof cannot move on the pin 14, on account of the angular relation of this pin.

The large opening at the upper end of the handle member through which the screw 23 passes is of considerably greater diameter than the diameter of the screw. In order to prevent transverse displacement of the handle relative to the screw, the bushing 25 is made to fit fairly closely around the screw 23 so that it is centered thereon, and the bushing has a projecting annular flange 26 of a diameter to fit snugly within the end of the handle member 20, and thus to keep this handle member centered relative to the screw 23. The bushing 25 also serves to space the handle member 20 from the bracket 13, keeping the handle member in the proper position when the screw 23 is screwed up.

From the foregoing description it will be seen that an exceedingly simple handle construction has been devised. After the brackets 12 and 13 have been fixed to the vessel, the handle member 20 may be applied extremely quickly by first slipping the lower end thereof over the pin 14 and then securing the upper end by the screw 23. Only one screw is required for holding the entire handle member securely and firmly in place.

The present invention permits the employment of handle members made according to the usual foundry practice of casting hollow members, and thus the handle members may be made comparatively cheaply, without any expense incident to special methods of casting.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. A handle construction for vessels comprising a pair of brackets of relatively soft moulded material fixed to a vessel, a pin of harder material moulded in one of said brackets and projecting therefrom, a threaded bushing of harder material moulded in the other of said brackets, a hollow handle member having an opening at each end thereof, one end of said handle member being slipped over said pin, and a screw passing through the opening at the opposite end of said handle member and threaded into said bushing for securing said opposite end to its bracket.

2. A handle construction for vessels comprising a pair of brackets fixed to a vessel, a threaded bushing fixed to the upper of said brackets, a hollow handle having a substantially horizontal upper section, one end of said handle being connected to the lower bracket by a pin fixed in one of the parts and slidably engaging a recess in the other part and a bolt threaded at one end passing through said horizontal handle section and screwing into said threaded bushing for securing said handle to said bracket, said bolt having an externally accessible head projecting through said horizontal handle section, and insulating bushings spacing said handle and brackets.

3. A handle construction for vessels comprising upper and lower brackets, a hollow handle member having a substantially horizontal upper section, the lower end of said handle being connected to the lower bracket by a pin fixed in said bracket and projecting therefrom, an insulator surrounding said pin and spacing the handle and bracket, threaded means passing longitudinally through the upper horizontal section of said handle for securing the handle to said upper bracket, and an insulator spacing said handle and bracket and centering said threaded member in said handle.

HOWARD H. SCHOTT.